(12) United States Patent
Graff et al.

(10) Patent No.: US 6,716,269 B1
(45) Date of Patent: Apr. 6, 2004

(54) CENTRIFUGE AND CASCADE FOR THE SEPARATION OF GASES

(75) Inventors: Emilio Castano Graff, Torrance, CA (US); Lance G. Hays, Placentia, CA (US)

(73) Assignee: Energent Corporation, Santa Ana, CA (US)

( * ) Notice: Subject to any disclaimer, the term of this patent is extended or adjusted under 35 U.S.C. 154(b) by 0 days.

(21) Appl. No.: 10/087,917

(22) Filed: Mar. 5, 2002

(51) Int. Cl.[7] ............................................. B01D 45/14
(52) U.S. Cl. ...................... 95/35; 95/270; 55/343; 55/345; 55/394; 55/404; 55/406; 96/314
(58) Field of Search .................. 55/408, 409, 343, 55/345, 418, 406, 394, 404; 96/314, 316; 95/34, 35, 258, 270, 254

(56) References Cited

U.S. PATENT DOCUMENTS

| | | | | |
|---|---|---|---|---|
| 3,643,406 A | * | 2/1972 | Ririe ........................... | 96/314 |
| 3,643,452 A | * | 2/1972 | Ruhemann et al. ........... | 62/639 |
| 4,092,130 A | * | 5/1978 | Wikdahl ........................ | 95/34 |
| 6,348,087 B1 | * | 2/2002 | Aslin ........................... | 96/210 |
| 6,363,923 B1 | * | 4/2002 | Pletschacher ................ | 123/585 |
| 2002/0189443 A1 | * | 12/2002 | McGuire ....................... | 95/32 |

FOREIGN PATENT DOCUMENTS

DE          10015546 A1   *   1/2001

* cited by examiner

Primary Examiner—Robert A. Hopkins
(74) Attorney, Agent, or Firm—William W. Haefliger

(57) ABSTRACT

A gas centrifuge operating to separate gases of differing chemical composition and molecular weight by a centrifugal force field. Such a centrifuge is operable to separate methane and carbon dioxide, and to produce torque, and a cascade of such centrifuges is operable to concentrate produced streams of carbon dioxide and methane, and to produce torque. A compact centrifugal gas processing system incorporating the gas centrifuge with other centrifugal components, is also provided.

40 Claims, 7 Drawing Sheets

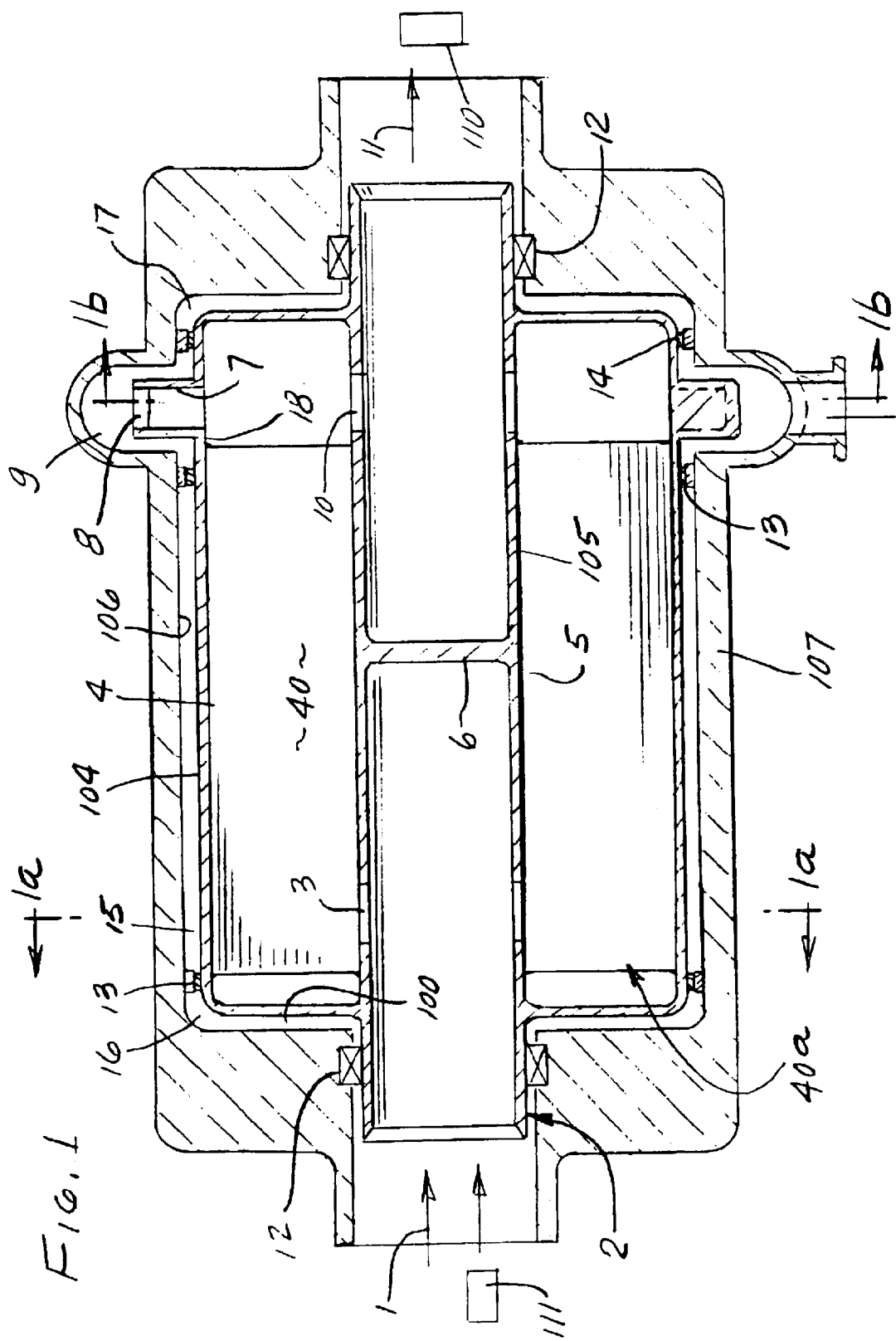

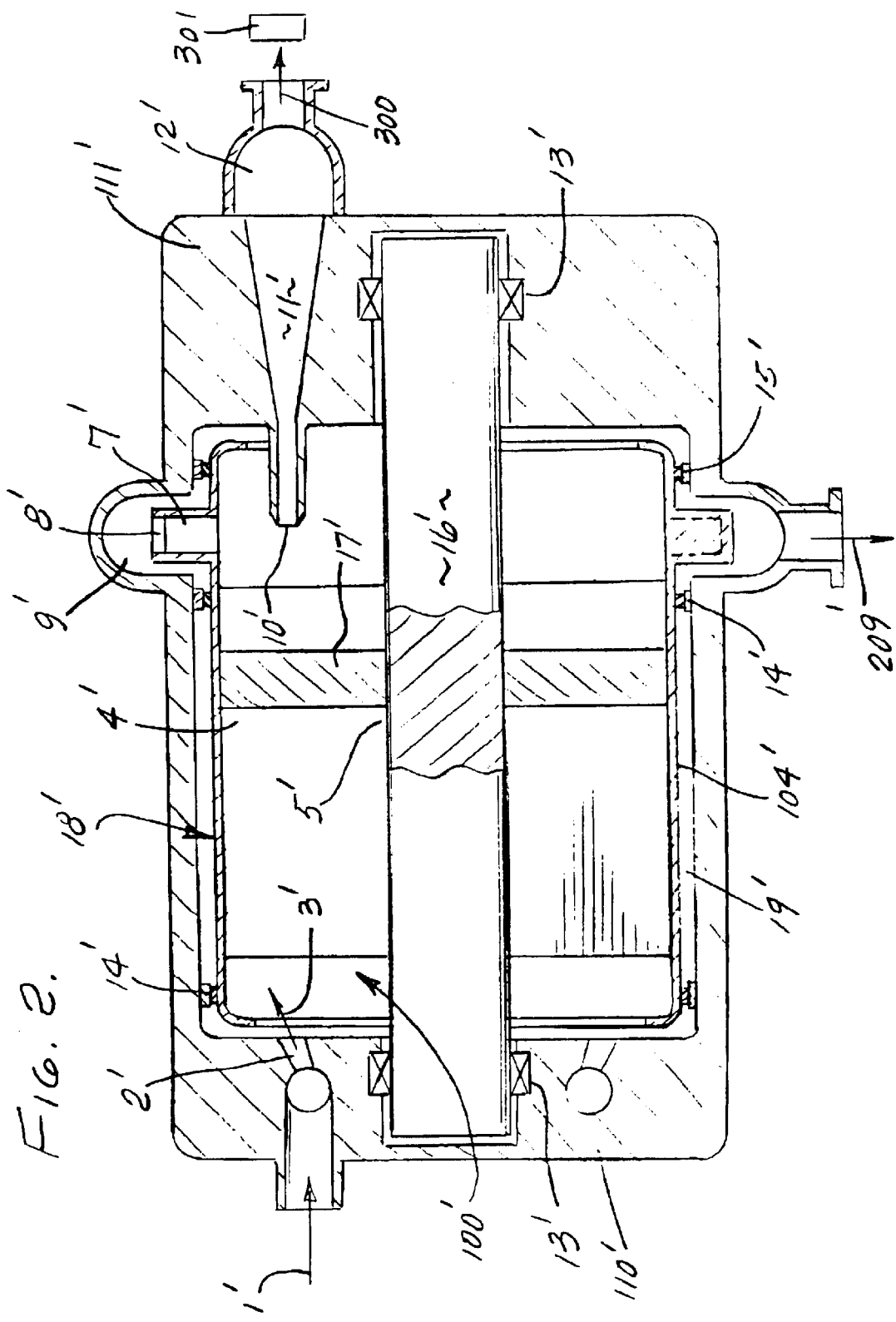

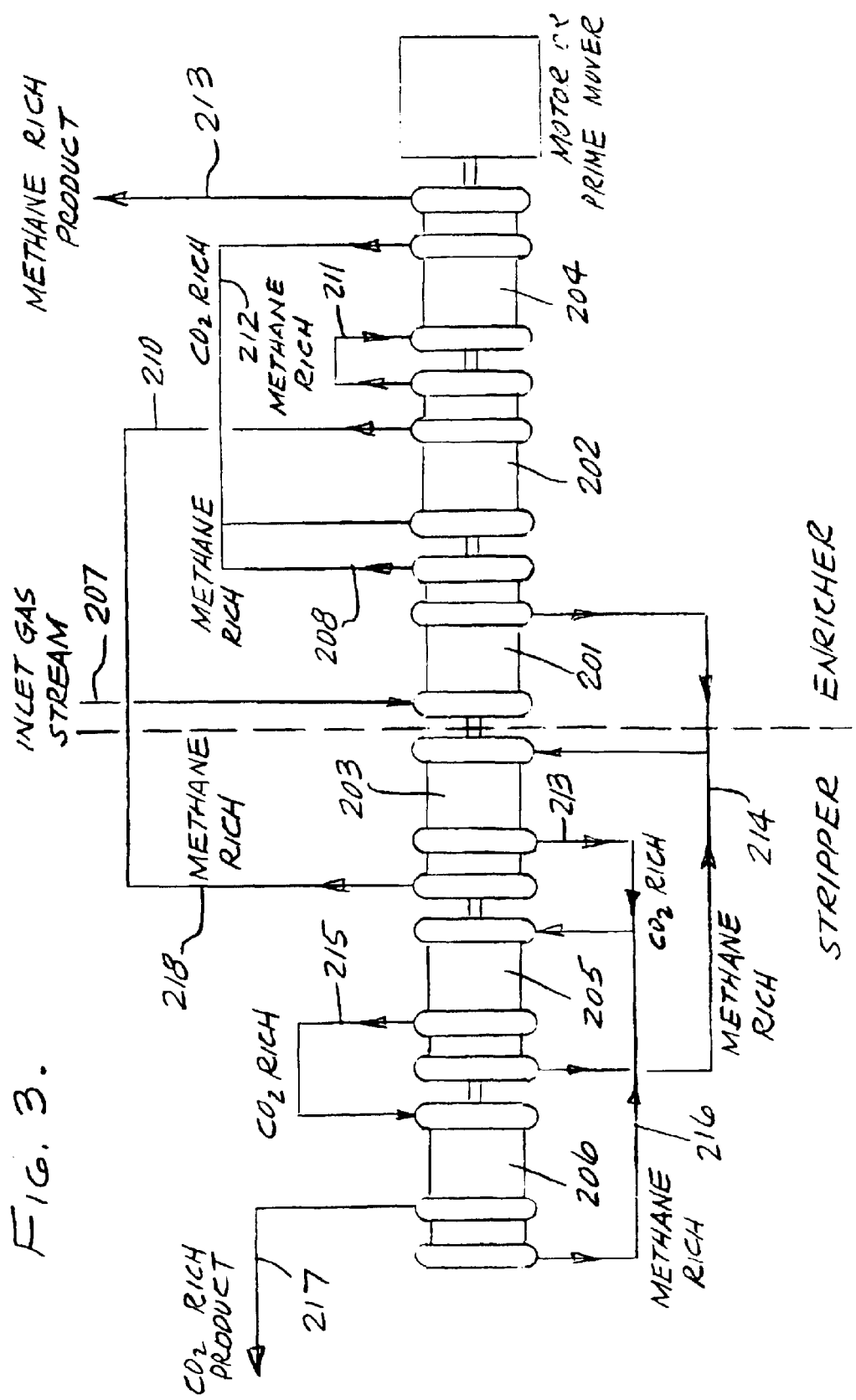

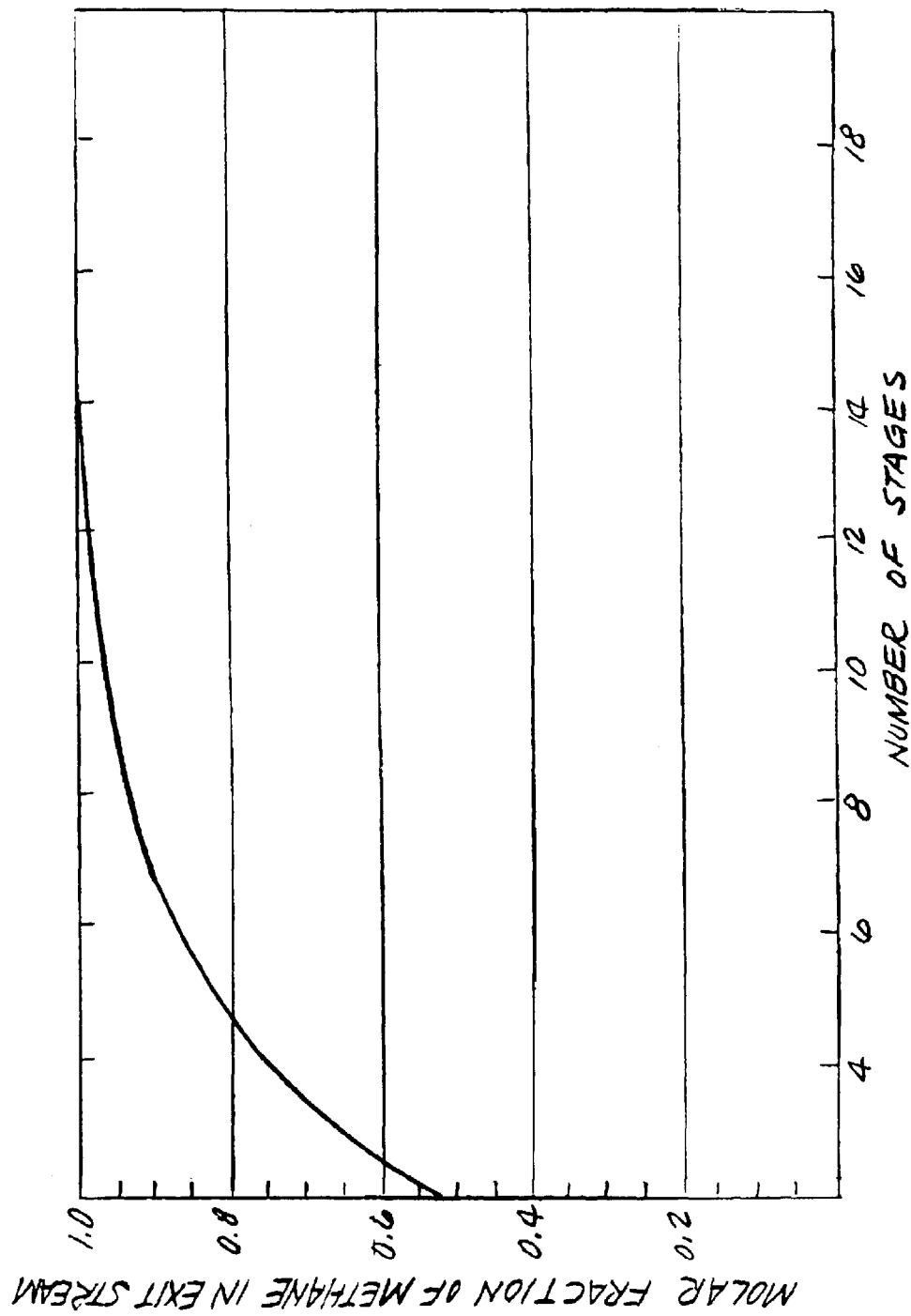
FIG. 4. FINAL CONCENTRATION OF METHANE VS. NUMBER OF CASCADE STAGES FOR AN INITIAL METHANE CONCENTRATION OF 0.3

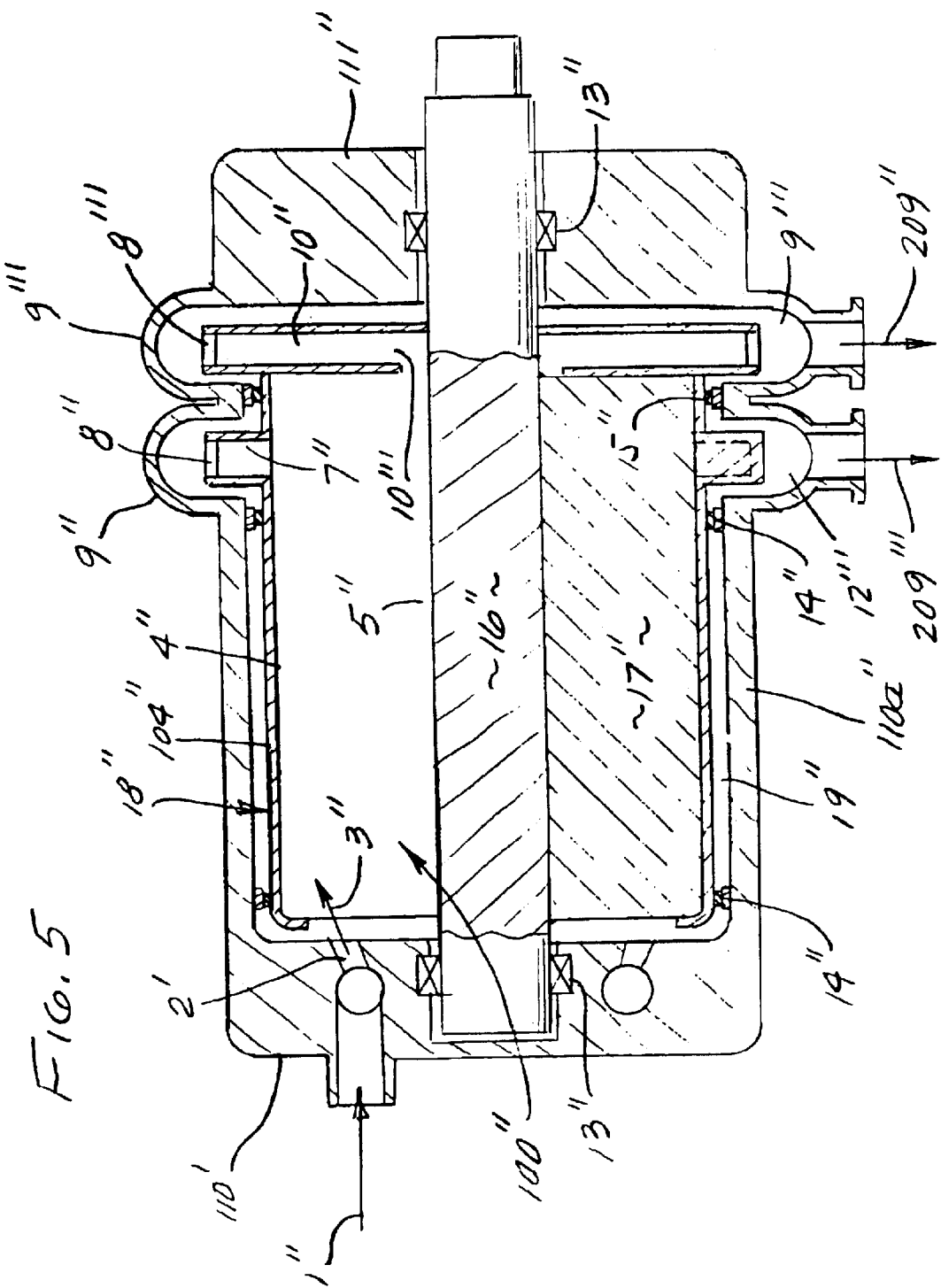

CENTRIFUGAL GAS PROCESSING SYSTEM

CENTRIFUGE AND CASCADE FOR THE SEPARATION OF GASES

BACKGROUND OF THE INVENTION

This invention relates generally to separation of gases, and more particularly to improvements in method and apparatus to centrifugally separate gaseous streams.

Nearly every source of natural gas has carbon dioxide, $CO_2$, as an impurity. The major hydrocarbon constituent of natural gas is methane, $CH_4$. For some sources the percentage of $CO_2$ may be as high as 70% while the methane component is only 30%. In order to process natural gas, the $CO_2$ content must be reduced. Current methods of reduction include absorption in a chemical solution or use of membranes. Both of these methods are costly and require a large amount of equipment and space. For offshore production and processing of natural gas, the cost and space requirements of these conventional methods of $CO_2$ reduction can result in an uneconomic project, reducing the recovery of the natural gas.

The possibility of using centrifugal force to separate gases was first suggested by Redig in 1895. Once isotopes were found to exist in 1913, centrifuges surged as a method of separating different isotopes by separating gaseous components. Beginning in the 1930's and through the Manhattan Project in the 1940's gaseous centrifuge research was directed to the enrichment of Uranium 235 for use as nuclear fuel.

Although the United States abandoned the method of centrifugal separation, preferring gaseous diffusion instead, the Soviet Union and a coalition of European nations continued to research gaseous centrifuges and eventually established plants of industrial capacity using such technology to produce enriched uranium. Recently, work has been done to separate other isotopes for use in, for example, the medical field.

Yet the possibility of using gaseous centrifuges as disclosed herein for the separation of two completely different gases has never seriously been explored. If such a system of gaseous centrifuges were provided and operated to separate two (or more) chemically different (as in not just different isotopes of the same element), the apparatus, as provided herein, would be physically smaller and would require less resources than alternative methods which are in use today, thus providing an economically best choice.

SUMMARY OF THE INVENTION

It is a major object of the invention to provide method and means for separating mixtures of gases into their components, in an improved and highly efficient way, or manner.

A gaseous centrifuge is a relatively small, enclosed device that rotates at extremely high speeds (upwards of 30,000 RPM) which takes advantage of centrifugal force to separate a mixture of gases. Once a mixture of gases is fed into such a centrifuge, a radial concentration gradient is established in which the heavier gas is at higher concentration (than the input stream) at the periphery and the lighter gas is at a higher concentration (than the input stream) in the region closer to the axis of rotation.

The partial pressure of a gaseous component in a centrifuge, assuming solid body rotation is given from the Maxwell-Boltzmann Distribution Laws as:

$$p_i(r) = p_1(0) \exp[M_i (\Omega r)^2 / 2RT]$$

where:
- $p_1$ = partial pressure of component 1 at location ( )
- $M_i$ = molecular weight of component 1
- $\Omega$ = angular velocity
- $r$ = radius
- $R$ = gas constant
- $T$ = temperature Comparing the concentration of two gaseous components gives:

$$\alpha = \exp[(M_2 - M_1)(\Omega r)^2 / 2RT]$$

where:
- $\alpha$ = ratio of concentration of component 2 to component 1
- $M_2$ = molecular weight of component 2
- $M_1$ = molecular weight of component 1

For separation of isotopes such as uranium 235 and uranium 238 the molecular weight difference is only 3 units resulting in a relatively small concentration factor and a huge number of concentration stages required to effect a substantial concentration. However, for mixtures of carbon dioxide and methane, the molecular weight difference is $$M_2 - M_1 = 44 - 16 = 28$$

This produces a large concentration ratio compared to typical isotope separations. Consider a speed of 3000 radians/second, a cylinder radius of 10 cm and a temperature of 300° K. For uranium 235 and uranium 238 separation, the concentration ratio is:

$$\alpha_1 = \exp[(3)(300)^2/(2)(8314)(300)] = 1.056$$

For $CO_2$ and $CH_4$ the concentration ratio is:

$$\alpha_1 = \exp[(28)(300)^2/(2)(8314)(300)] = 1.657$$

Thus, an unexpected result as disclosed herein is found in applying a centrifuge to separate carbon dioxide from methane in that an extraordinary increase in concentration can be accomplished compared to isotopic separation.

Accordingly, another major object is to provide a gas centrifuge means operating to separate gases of differing chemical composition and molecular weight by a centrifugal force field. Typically, and in accordance with a further feature of the invention, carbon dioxide is separated from methane by an improved method employing a centrifugal force field.

Another object is to provide a multiplicity of centrifuge means as defined in claim 1, arranged such that the separated streams of gases are further concentrated by introducing them into successive of the gas centrifuge means.

An additional object is to provide a gas processing system utilizing centrifugal force for the separation of light gases from heavy gases, liquids from gases, light liquids from heavy liquids and solids from liquids and gases.

An additional object if to provide a gas centrifuge apparatus comprising, in combination:

a) a hollow shaft to pass and introduce a gas mixture into a rotating cylinder, b) said cylinder having axial vanes to cause the gas mixture to rotate with the same angular speed as the cylinder, c) a radial passage connected to the periphery of the cylinder to receive and pressurize a produced and concentrated heavier gas stream, d) a nozzle connected to the passage to convert the pressure of the heavier gas stream to velocity adding a torque to the cylinder, and e) an opening in the hollow shaft to receive and remove a produced and concentrated lighter gas stream from the cylinder.

A yet further object is to provide an improved centrifuge apparatus operating in the manner referred to, and incorporating:

a) a nozzle accelerating a gas mixture and introducing it into a rotating cylinder, adding torque to the cylinder, b) the cylinder having vanes to receive torque from the gas and causing the gas to rotate with the same angular speed as the cylinder, c) a radial passage connected to the periphery of the cylinder operating to pressurize a produced and concentrated heavier gas stream, d) a nozzle connected to the passage and operating to convert the pressure of the heavier gas stream to velocity, adding torque to the cylinder, e) an open scoop oriented perpendicular to the direction of rotation operating to remove a produced and concentrated lighter gas from the cylinder, and f) a passage contoured and operating to recover the velocity head of the concentrated lighter gas as pressure.

A yet further object is to provide an improved centrifuge apparatus operating in the manner referred to, and incorporating;

a) a nozzle accelerating a gas mixture and introducing it into a rotating cylinder, adding torque to the cylinder, b) the cylinder having vanes to receive torque from the gas and causing the gas to rotate with the same angular speed as the cylinder, c) a radial passage connected to the periphery of the cylinder operating to pressurize a produced and concentrated heavier gas stream, d) a nozzle connected to the passage and operating to convert the pressure of the heavier gas stream to velocity, adding torque to the cylinder, e) a radial passage connected to the periphery of the cylinder, extending radially inward such that its inlet is at the region of concentration of the lighter gas and operating to pressure a produced and concentrated lighter gas stream, f) a nozzle connected to the radial passage and operating to convert the pressure of the concentrated lighter gas to velocity, adding torque to the cylinder.

These and other objects and advantages of the invention, as well as the details of an illustrative embodiment, will be more fully understood from the following specification and drawings, in which:

DRAWING DESCRIPTION

FIG. 1 is a section taken through one form of improved gas separation apparatus embodying the invention; and FIGS. 1a and 1b are sections taken on lines 1a—1a and 1b—1b shown in FIG. 1;

FIG. 2 is a section taken through another form of improved gas separation apparatus embodying the invention;

FIG. 3 is a centrifuge cascade system block diagram;

FIG. 4 is a graph showing how the number of centrifuge stages increases methane concentration where methane is being centrifugally separated from carbon dioxide;

FIG. 5 is a section taken through another form of improved gas separation apparatus embodying the invention.

DETAILED DESCRIPTION

Figure 1A:
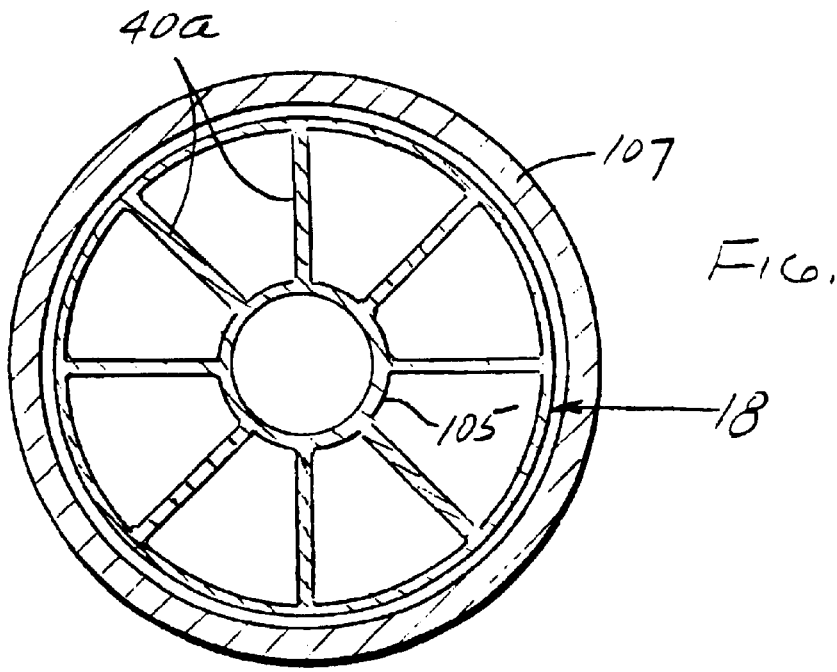
Figure 1B:
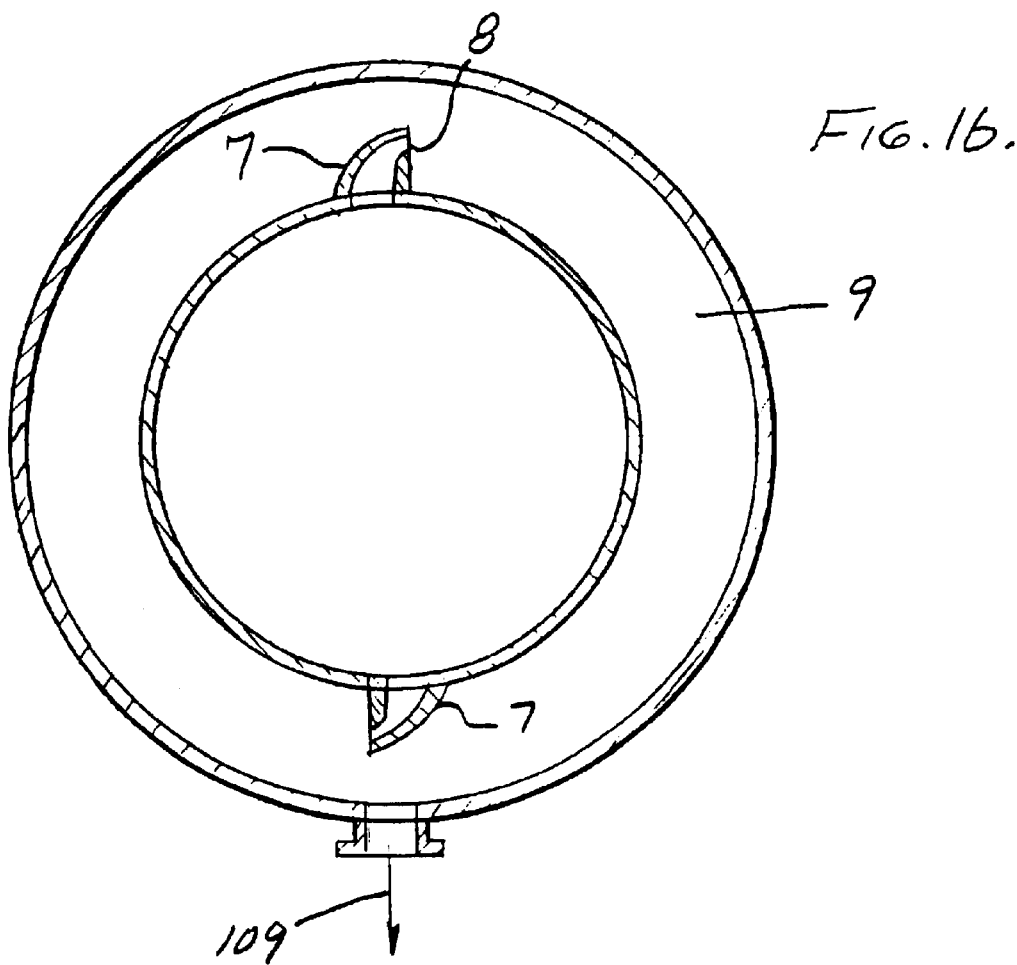

FIG. 1 shows a centrifuge that can be used to decrease the concentration of $CO_2$ in a gas mixture without any chemical absorption or membranes.

A mixture of methane, $CO_2$, and any other gas species is introduced at 1 to the centrifuge 100, via a hollow shaft 2. The shaft is supported by bearings as at 12 and the gas is introduced to the hollow shaft through a fixed seal assembly associated with 12. The gas flows axially into the centrifuge from the shaft through side opening 3.

The gas in the centrifuge interior 40 is subjected to the centrifugal force produced by the rotation of the centrifuge. Rotation of the gas is caused by axial vanes 40a attached to the centrifuge shaft. Such rotation can be produced either by applying a torque to the shaft 2, or by causing a pressure drop across a nozzle 8, which produces a reaction force from outflow of the gas, within 40.

The heavier carbon dioxide gas ($CO_2$, molecular weight=44, and other heavier gases such as $H_2S$, molecular weight=34) is concentrated at the centrifuge outer radius zone 4, near outer cylindrical wall 104. The lighter methane gas ($CH_4$, molecular weight=16) is concentrated at the inner radius zone 5 near inner cylindrical wall 105. The carbon dioxide rich gas is removed through a passage 7 communicating with zone 4, and reaction nozzle 8, at the periphery of the centrifuge rotor part 18. The carbon dioxide is isolated from the lower pressure gas in zones 15, 16, and 17, surrounding the centrifuge rotor by annular seals, 13 and 14, between 18 and bore 106 of housing 107. The concentrated carbon dioxide is removed through a volute 9, discharging at 110.

The enriched methane is removed through a port, 10, in the hollow shaft 2, and flows at 11 to another part 110 of the process. Wall 6 in the shaft separates flows 1 and 11. Auxiliary means to rotate the shaft is shown at 111.

FIG. 2 shows another centrifuge which can be used to decrease the concentration of carbon dioxide in a gas mixture.

A gas mixture 1', enters the centrifuge 100' via wall 110' and flows to a nozzle 2', which is oriented in a generally tangential direction to a cylindrical rotor 18'. The gas mixture is expanded in the nozzle to a high exit velocity at 3', in a direction generally tangential to the rotor. The gas flows through axial vanes 17', with turbine effect, which support the rotor from a shaft 16'. Nozzle 2' is radially offset relative to rotary shaft 16'. The rotor acquires the circumferential velocity component of the entering gas.

The heavier carbon dioxide is concentrated by the centrifugal force at centrifuge outer radius zone 4', near outer wall of the rotor 104'. The lighter methane is concentrated at the inner radius zone 5' near the surface of shaft 16' of the rotor. The concentrated carbon dioxide stream flows through outlet passage 7' increasing its pressure. The flow is then accelerated through a nozzle 8, adding more torque to the rotor to overcome windage and friction losses. The concentrated carbon dioxide stream is removed through a volute 9', discharging at 209'.

The concentrated methane stream flows into an outlet scoop 10', which faces in generally tangential relation to the circumferential flow direction to remove a produced and concentrated lighter gas such as methane, from the cylinder.

The velocity is converted to pressure by the passage 11', which has an increasing flow area within wall 111' to diffuse the velocity and recover the velocity head as increased pressure at 12', and delivered at 300 to process 301. The concentrated methane is removed through another volute 12' at the outer side or end of 111'.

The rotor is supported by annular bearings 13' located between the shaft 16 and bores in end walls 110' and 111'. If sufficient pressure drop is available between 1' and 3', the shaft may be totally enclosed; otherwise, a seal is incorporated in the structure 13', and a power source 301 is provided to rotate the centrifuge at desired speed.

The pressure within the rotor 18' is isolated by annular seals 14' and 15' from the low pressure on the outer side 19' of the rotor, which is required to minimize frictional losses at the high speed of the rotor. The concentrated $CO_2$ in the volute 9', is isolated from the pressure within the rotor 18', and the pressure at zone 19' surrounding the rotor, by seals 14' and 15'.

FIG. 5 shows another centrifuge which can be used to decrease the concentration of carbon dioxide in a gas mixture.

A gas mixture 1", enters the centrifuge 100" via wall 110' and flows to a nozzle 2', which is oriented in a generally tangential direction relative to a cylindrical rotor 18". The gas mixture is expanded in the nozzle to a high exit velocity at 3", in a direction generally tangential to the cylindrical rotor. The gas flows through axial vanes 17", with turbine effect, which support the rotor from a shaft 16". Nozzle 2" is radially offset relative to rotary shaft 16". The rotor acquires the circumferential velocity component of the entering gas.

The heavier carbon dioxide is concentrated by the centrifugal force at centrifuge outer radius zone 4", near outer wall 104" of the rotor. The lighter methane is concentrated at the inner radius zone 5" near the surface of shaft 16" of the rotor. The concentrated heavier carbon dioxide stream flows through outlet passage 7", increasing its pressure. The flow is then accelerated through a nozzle 8", adding more torque to the rotor to overcome windage and friction losses. The concentrated carbon dioxide stream is removed through a volute 9", discharging at 209'''.

The concentrated methane stream flows into another outlet passage 10", whose inlet 10''' is located radially inward at the radial location 5" where the lighter gas is concentrated. The concentrated methane stream flows through the outlet passage 10" increasing it's pressure. The flow is then accelerated through a nozzle 8''' adding more torque to the rotor to overcome windage and friction posses. The concentrated methane is removed through another volute 9''' discharging at 209".

The rotor is supported by annular bearings 13" located between the shaft 16" and bores in end walls 110" and 111".

The pressure within the rotor 18" is isolated by annular seals 14" and 15" from the low pressure on the outer side 19" of the rotor, which is required to minimize frictional losses at the high speed of the rotor. Such seals seal off between 18" and wall 110a". The concentrated $CO_2$ in the volute 9", is isolated from the pressure within the rotor 18" and the pressure at zone 19" surrounding the rotor, by seals 14" and 15".

To further concentrate the carbon dioxide stream and the methane stream, the flows at 9" and 12" leaving the centrifuge from FIG. 5, can be introduced to additional like centrifuges, i.e. a "cascade" of centrifuges. The cascade provides a method of connecting many centrifuges together so as to amplify the separation capacity and flow rate of a single unit.

The cascade is typically comprised of a number of stages, the size of each stage being defined by the amount of flow that must go through the cascade. The amount of flow required is directly related to the desired flow of the product (the stream comprised mostly of the lighter gas) and its concentration. The desired concentration, in turn, determines the number of stages necessary. The product delivery end of the cascade is called the "top" while the waste end is called the "bottom".

The cascade is divided into two sections, the "stripper" and the "enricher". The enricher section is that between the feed point (where the mixture comes in) and the top of the cascade, while the These sections are called stripper and enricher because the stripper can be thought of as concentrating the waste (heavier) gas, while the enricher concentrates the product (lighter) gas.

All the stages except the top, bottom, and the first enricher stage have equivalent connections. The feed is comprised of the waste of the stage above and the product of the stage below. The feed of the top stage is only the product of the stage below it, while the feed of the bottom stage is only the waste of the one above it. The feed at the first enricher stage is comprised of the product from the stage below it, the waste from the stage above it, and the feed into the cascade.

To avoid mixing, and therefore to make the cascade as efficient as possible, each stage has a different proportion of its output that is selected as the product and the waste. This proportion is called the cut and is directly related to the desired product flow, the concentrations of the outputs, and the separation power of the centrifuge.

FIG. 3 shows a cascade arrangement of six centrifuges. More or less can be used with the same principles. A flow mixture of carbon dioxide and methane and/or other gases 207, enters a centrifuge 201. A carbon dioxide concentrated stream 210, from another centrifuge 202, is also introduced to the first centrifuge 201. An enriched methane stream 218, from another centrifuge 203, is also introduced to the first centrifuge 201. The composition of the carbon dioxide concentrated stream 210, from centrifuge 202, and the composition of the enriched methane stream 218 from centrifuge 203, is made equal or nearly equal to the composition of the initial stream 207.

The enriched methane stream 208, from the first centrifuge 201, enters the second centrifuge 202. A carbon dioxide concentrated stream 212, from another centrifuge 204, having an equal or nearly equal composition as stream 208, is also introduced to centrifuge 202. The concentrated carbon dioxide stream 210, leaving centrifuge 202, is introduced to the first centrifuge 201. The enriched methane stream 211, leaving centrifuge 202 is introduced to centrifuge 204.

The enriched methane stream 213, leaving centrifuge 204, is the product stream of enriched methane, having a minimum amount of carbon dioxide. The concentrated carbon dioxide waste stream 212, from centrifuge 204 is introduced to centrifuge 202 for further concentration.

The concentration of the waste carbon dioxide stream 209, from the first centrifuge 201, is increased by introducing the stream into another centrifuge 203. The enriched methane stream 218, from centrifuge 203 is fed to the first centrifuge 201. The concentrated carbon dioxide stream 213, leaving centrifuge 203, is introduced to another centrifuge 205, for further concentration.

The enriched methane stream 214, is introduced to centrifuge 203 for further enrichment. The concentrated carbon dioxide stream 215, is introduced to another centrifuge 206, for further concentration.

The enriched methane stream 216, from centrifuge 206 is introduced to centrifuge 205 for further enrichment. The concentrated carbon dioxide waste stream 217, from centrifuge 206 is the final "waste" stream and flows to that part of the process where it is used or disposed of.

The enrichment of methane in the product stream and the concentration of carbon dioxide in the waste stream are shown in graph form in FIG. 4 for a cascade using centrifuges operating at 48,000 rpm, each having a radius of 8 centimeters. The initial concentration is 30% methane (by mole) and 70% carbon dioxide.

The concentration of methane increases from 30% to 86% with 6 stages. Increasing the number of stages to 16 results in virtually complete separation.

The use of centrifugal forces in the gas centrifuge can be combined with centrifugal forces in other devices to produce a gas processing system which is very compact and which utilizes the energy in high pressure gas sources to reduce energy consumption.

Figure 6:
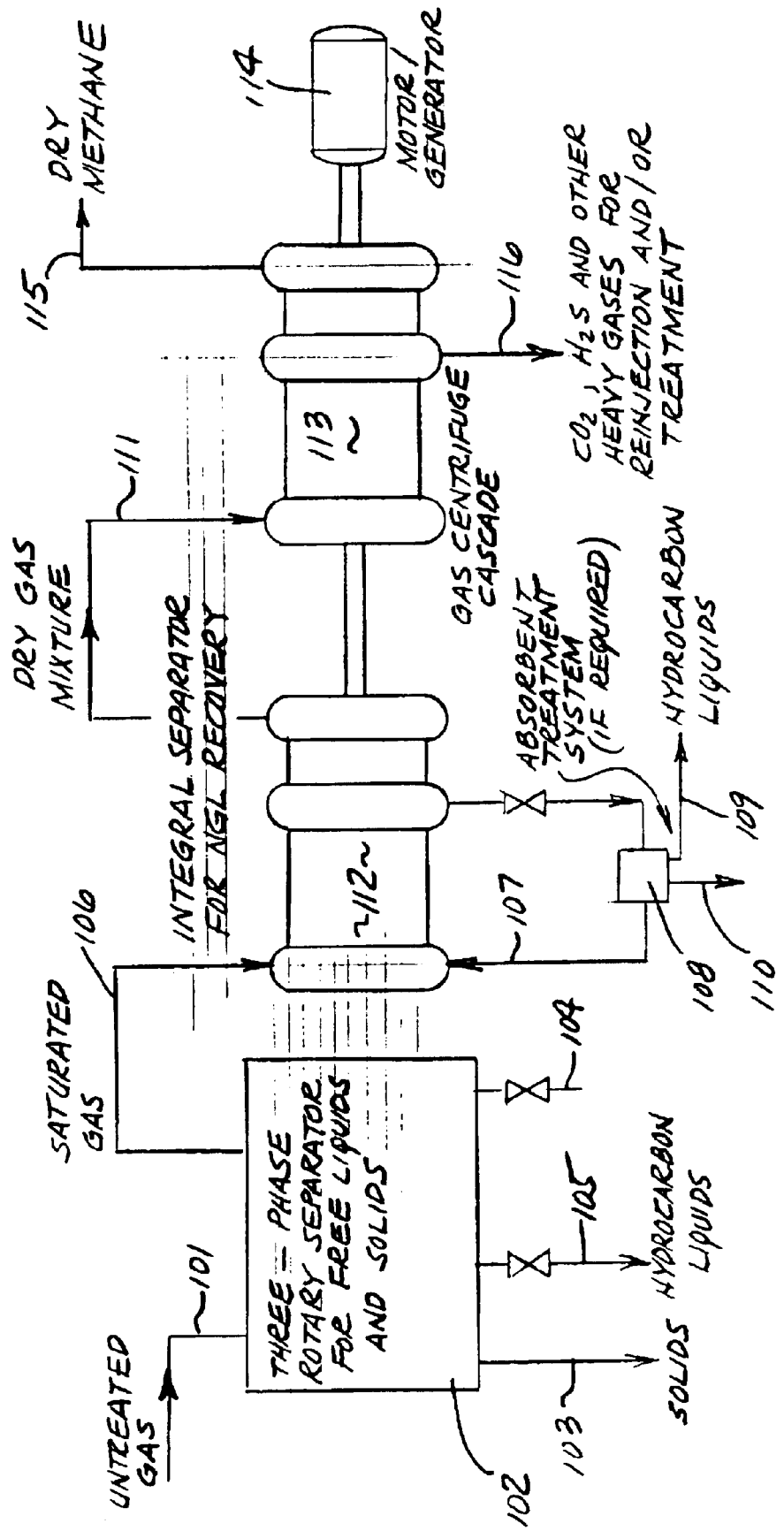
FIG. 6 is a showing of a modification.

FIG. 6 illustrates a centrifugal gas processing system.

Untreated gas 101 enters a Three-Phase Rotary Separator 102. The Three-Phase Rotary Separator separates solids 103, free water 104, and free hydrocarbon liquids 105 from the gas.

The saturated gas 106 flows from the Three-Phase Separator into the Integral Separator 112. The Integral Separator is a centrifugal gas-liquid separator, which derives all or part of the rotational energy required from the gas pressure letdown. The functions of the Integral Separator are:

To lower the temperature of the gas stream by near isentropic expansion in order to condense out natural gas liquids and water, if present.

Separation of the liquids from the gas using a rotating separation surface driven by the fluid energy.

Re-compression of the separated gas with a radial diffuser to decrease the dewpoint (dehydration) and remove the kinetic energy from the flow.

Methanol or another absorbent 107 can be injected in the Integral Separator nozzles and separated for re-use 108. The separated hydrocarbon liquids 109 are collected for use. The waste products 110 from the absorbent treating system are collected for disposal or further treatment.

The dry separated gas 111 flows into the gas centrifuge cascade 113. The gas centrifuge separates the heavier gases such as $CO_2$, $H_2S$ and sulfur compounds from the much lighter methane. The large molecular weight difference results in higher concentration relative to other gas centrifuge applications. Fluid and/or shaft energy from the Integral Separator is used to supply or augment the power required for the gas centrifuge rotation. a motor drive 114 can provide the balance if required. In the event of excess shaft energy, such as can be achieved for high gas pressures, a generator can be used to generate power for other parts of the facility.

The dry methane 115 is delivered to the pipeline. The $CO_2$, $H_2S$ and sulfur compounds 116 are delivered for re-injection or treatment.

The system's primary benefits are:

Compact size resulting from centrifugal processing.

Maximization of the recovery of natural gas liquids (NGL).

Low energy consumption (or energy production).

Reduction of the balance of plant.

Reduction of chemical requirements.

Portability.

Marinization potential for subsea application.

We claim:

1. A centrifuge means operating to separate gases of differing chemical composition and molecular weight by a centrifugal force field, there being vanes associated with said centrifuge means to receive and pass said gases, with turbine effect.

2. A multiplicity of centrifuge means as defined in claim 1, arranged such that the separated gases are further concentrated by introducing them into successive of said gas centrifuge means.

3. A gas processing system including a centrifuge means operating to separate carbon dioxide from methane by a centrifugal force field, and vanes associated with said centrifuge means to receive and pass the carbon dioxide and methane mixture with turbine effect.

4. A multiplicity of centrifuge means as defined in claim 3 configured such that the separated streams of carbon dioxide and methane are further concentrated by introducing them into successive of said gas centrifuge means.

5. A gas centrifuge comprising, in combination:
a) a hollow shaft to pass and introduce a gas mixture into a rotating cylinder,
b) said cylinder having axial vanes to cause the gas mixture to rotate with the same angular speed of the cylinder,
c) a radial passage connected to the periphery of the cylinder to receive and pressurize a produced and concentrated heavier gas stream,
d) a nozzle connected to the passage to convert the pressure of the heavier gas stream to velocity adding a torque to the cylinder, and
e) an opening in the hollow shaft to receive and remove a produced and concentrated lighter gas stream from the cylinder.

6. The combination of claim 5 where the heavier gas stream consists of carbon dioxide and the lighter gas stream consists of methane.

7. The combination of claim 5 wherein seals are provided to isolate cylinder inlet and exit gas streams from each other and from gas surrounding the cylinder.

8. The combination of claim 5 wherein bearings are provided to support the shaft.

9. The combination of claim 5 wherein a prime mover is connected to the shaft to rotate the cylinder.

10. A cascade of centrifuges as defined in claim 6.

11. The combination of claim 5 wherein the heavier gas stream consists essentially of carbon dioxide and the lighter gas stream consists of another gas.

12. The combination of claim 11 wherein the heavier gas stream consists of carbon dioxide, and the lighter gas stream consists of methane.

13. A gas centrifuge comprising, in combination:
a) a first nozzle accelerating a gas mixture and introducing it into a rotating cylinder, adding torque to the cylinder,
b) said cylinder having associated vanes to receive torque from the flowing gas and causing the gas to rotate with the same angular speed as the cylinder,
c) a radial passage connected to the periphery of the cylinder operating to pressurize a produced and concentrated heavier gas stream,
d) a second nozzle connected to the passage and operating to convert the pressure of the heavier gas stream to velocity, adding torque to the cylinder,
e) an open scoop oriented perpendicular to the direction of rotation operating to remove a produced and concentrated lighter gas from the cylinder, and f) a passage contoured and operating to recover the velocity head of the concentrated lighter gas as pressure.

14. The combination of claim 13 where the heavier gas stream consists of carbon dioxide and the lighter stream consists of methane.

15. The combination of claim 13 wherein seals are provided to isolate cylinder inlet and exit gas streams from each other and from the gas surrounding the cylinder.

16. The combination of claim 13 wherein bearings are provided to support the shaft.

17. The combination of claim 13 wherein a prime mover is connected to the shaft to rotate the cylinder.

18. The combination of claim 13 including a shaft supporting the cylinder for rotation, and a housing enclosing and supporting the shaft.

19. The combination of claim 18 wherein said first nozzle is carried by the housing, at one end of the cylinder.

20. The combination of claim 19 wherein said second nozzle is located near the opposite end of the cylinder, said vanes located between said first and second nozzles.

21. A cascade of centrifuges as defined in claim 14, for successively increasing concentrations of carbon dioxide and methane in said streams.

22. The combination of claim 13 wherein the heavier gas stream consists essentially of carbon dioxide and the lighter gas stream consists of another gas.

23. A gas centrifuge comprising, in combination:
   a) a first nozzle accelerating a gas mixture and introducing it into a rotating cylinder, adding torque to the cylinder,
   b) said cylinder having associated vanes to receive torque from the flowing gas and causing the gas to rotate with the same angular speed as the cylinder,
   c) a first radial passage connected to the periphery of the cylinder operating to pressurize a produced and concentrated heavier gas stream,
   d) a second nozzle connected to the first passage and operating to convert the pressure of the heavier has stream to velocity, adding torque to the cylinder,
   e) a second radial passage connected to the periphery of the cylinder operating to pressurize a produced and concentrated lighter gas stream,
   f) a third nozzle connected to the second passage and operating to convert the pressure of the lighter gas stream to velocity adding torque to the cylinder.

24. The combination of claim 23 where the heavier gas stream consists of carbon dioxide and the lighter stream consists of methane.

25. The combination of claim 23 wherein seals are provided to isolate cylinder inlet and exit gas streams from each other and from the gas surrounding the cylinder.

26. The combination of claim 23 wherein bearings are provided to support the shaft.

27. The combination of claim 23 wherein a prime mover is provided and is connected to the shaft to rotate the cylinder.

28. A cascade of centrifuges as defined in claim 24.

29. The combination of claim 23 wherein the heavier gas stream consists essentially of carbon dioxide and the lighter gas stream consists of another gas.

30. A method that includes
   a) providing a mixture of gases having carbon dioxide and/or other heavy gases and methane components, and also providing a rotary centrifuge,
   b) operating the rotary centrifuge to separate said components into separate streams,
   c) using the separated stream of carbon dioxide and methane to produce torque acting to aid rotation of the centrifuge.

31. The method of claim 30 including using said mixture received by the centrifuge as a flowing stream to produce torque acting to aid rotation of the centrifuge.

32. The method that includes
   a) providing a rotary centrifuge to receive a mixture of gases having carbon dioxide and/or other heavy gases and methane components,
   b) operating the rotary centrifuge to separate said components into separate streams,
   c) using the separated streams of carbon dioxide and methane to produce torque acting to aid rotation of the centrifuge,
   d) and including providing vanes in the centrifuge to receive and pass a gaseous mixture.

33. A centrifugal gas processing system comprising:
   a) a first centrifugal means to separate free liquids from gas, light liquids from heavy liquids, and solids from liquids,
   b) a second centrifugal means to extract liquids from said gas by lowering the pressure and temperature and separating the formed liquids from the gas,
   c) a third centrifugal means to process said gas thereby to separate heavy gases from light gases,
   d) there being vanes associated with it least one of said second and/or third centrifugal means to receive and pass a mixture of gases or a gas/liquid mixture with turbine effect.

34. The combination of the claim 33 system together with a means to inject a treatment liquid into said system for purposes of gas treatment.

35. A centrifugal gas processing system comprising:
   a) a first centrifugal means to separate free liquids from gas, light liquids from heavy liquids, and solids from liquids,
   b) a second centrifugal means to extract liquids from said
   a) gas by lowering the pressure and temperature and separating the formed liquids from the gas,
   c) there being vanes connected with said second centrifugal means to receive a flowing stream of liquid, with turbine effect.

36. A centrifugal gas processing system comprising in combination:
   a) a first centrifugal means to extract liquids from gas by lowering the pressure and temperature and separating the formed liquids from the gas,
   b) a second centrifugal means to process said gas thereby to separate heavy gases from light gases,
   c) and means to inject a treatment liquid into said system first centrifugal means for purposes of gas processing.

37. A centrifugal gas processing system, comprising:
   a) a first centrifugal means to separate free liquids from gas, light liquids from heavy liquids, and solids from liquids,
   b) a second centrifugal means to extract liquids from said gas by lowering the pressure and temperature and separating the formed liquids from the gas,
   c a third centrifugal means to process said gas thereby to separate heavy gases from light gases,
   d and means to inject a treatment liquid into said first centrifugal means for purposes of gas processing.

38. A centrifugal gas processing system comprising in combination:
- a) a first centrifugal means to extract liquids from gas by lowering the pressure and temperature and separating the formed liquids from the gas,
- b) a second centrifugal means to process said gas thereby to separate heavy gases from light gases,
- c) and including means to inject a treatment liquid into said first centrifugal means for purposes of gas treatment,
- d) and vanes in the system to receive and be rotated by fluid flowing in the system, with turbine effect.

39. A gas processing system comprising
- a) a centrifugal means to extract liquids from gas by lowering the pressure and temperature and separating the formed liquids from the gas,
- b) means to inject a treatment liquid into said centrifugal means for purposes of gas treatment,
- c) there being vanes in said centrifugal means to receive and pass a flowing gas/liquid mixture with turbine effect.

40. A system including a gas liquid separator and a gas centrifuge means, to receive a fluid stream and operating to separate carbon dioxide from another gas, there being vanes associated with said centrifuge means to receive the fluid stream, with turbine effect, and there being means to inject a treatment fluid to flow into the gas liquid separator for purposes of fluid treatment.

* * * * *